March 13, 1962 A. R. CLARK ETAL 3,024,922
STORAGE AND FEEDING APPARATUS
Original Filed April 4, 1956 3 Sheets-Sheet 1
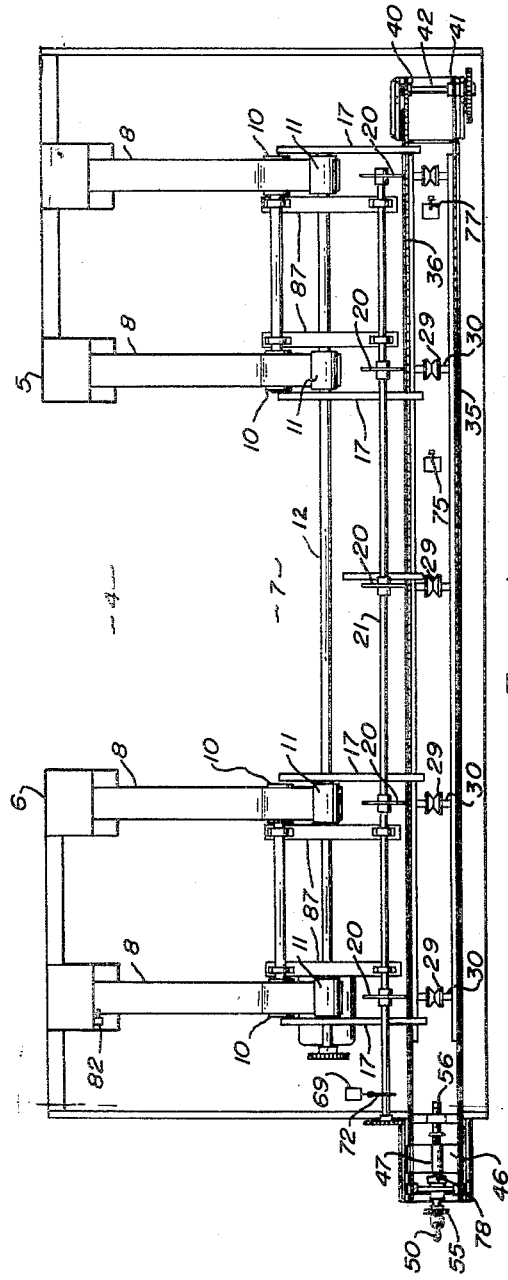
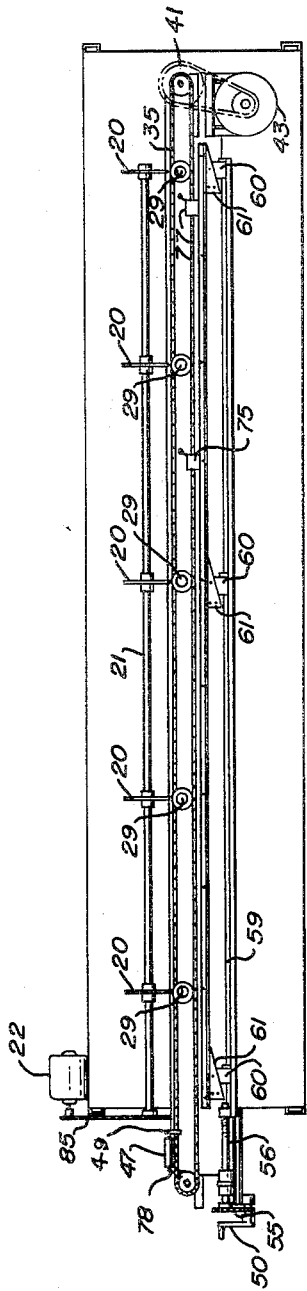
INVENTORS
ALBERT R. CLARK
WILLIAM B. CLARK
BY
*W. P. Carr*
ATTORNEY March 13, 1962    A. R. CLARK ETAL    3,024,922
STORAGE AND FEEDING APPARATUS
Original Filed April 4, 1956    3 Sheets-Sheet 2

INVENTORS
ALBERT R. CLARK
WILLIAM B. CLARK
BY
W. P. Carr
ATTORNEY

INVENTORS
ALBERT R. CLARK
WILLIAM B. CLARK
ATTORNEY

United States Patent Office 3,024,922
Patented Mar. 13, 1962

3,024,922
STORAGE AND FEEDING APPARATUS
Albert R. Clark and William B. Clark, both of
346 W. 5th St., Perrysburg, Ohio
Original application Apr. 4, 1956, Ser. No. 576,063.
Divided and this application Nov. 7, 1958, Ser. No. 772,632
7 Claims. (Cl. 214—16)

This invention relates to an apparatus for receiving a load of tubes or the like from a lift truck or other conveying device and delivering them one at a time as required in a subsequent production operation.

More particularly it relates to such an apparatus which may be automatically or hand controlled and is utilized in continuously delivering tubes in controlled sequence to a machine cutting the tubes into predetermined short lengths or performing some other operation thereon such as swaging the ends.

This application is a division of application Serial No. 576,063, filed April 4, 1956, now abandoned.

In a factory such as an automobile plant tubes are produced or purchased in long lengths and are subsequently cut to various shorter lengths depending upon their ultimate use such as steering column masts, shock absorber casing, drive shafts, tail pipes, and so forth.

In modern plants under high production with automatic machines in continuous operation the problem of storing and delivering material to the machine has become of major importance. Hand mehods have proved inadequate and other more effective means are constantly being adopted so as to expedite the over all operation of the plant.

Because of the lag in storage and handling processes and equipment, this part of the activity of a plant has frequently constituted a prime factor in limiting production capacity. Bulk storage and conveyance by power lift trucks have had to be supplemented by some means of taking single pieces from a stack or bin and delivering them individually and in proper timing to the machine upon which they are next subject to some operation.

With small articles this problem has not been too difficult to solve. However, with bar stock, pipe and tubes of substantial length and weight the solution has eluded discovery. Accordingly, hand loading of these heavier objects has persisted in spite of production delays occasioned thereby.

It is a prime object of this invention to provide an apparatus for automatically receiving and storing such cumbersome elongated pieces and delivering them singly as required in production procedures.

A supplemental object of this invention is to deliver such objects as rapidly and as closely in succession as the receiving machine or conveyor can handle them.

Another object is to deliver the elongated pieces with smooth, precise and regular movement.

Other objects and advantages of the invention will become apparent upon reading the following description and referring to the drawings in which:

FIGURE 1 is a plan view of an apparatus embodying the invention;

FIGURE 2 is a front elevation thereof;

Figure 3:
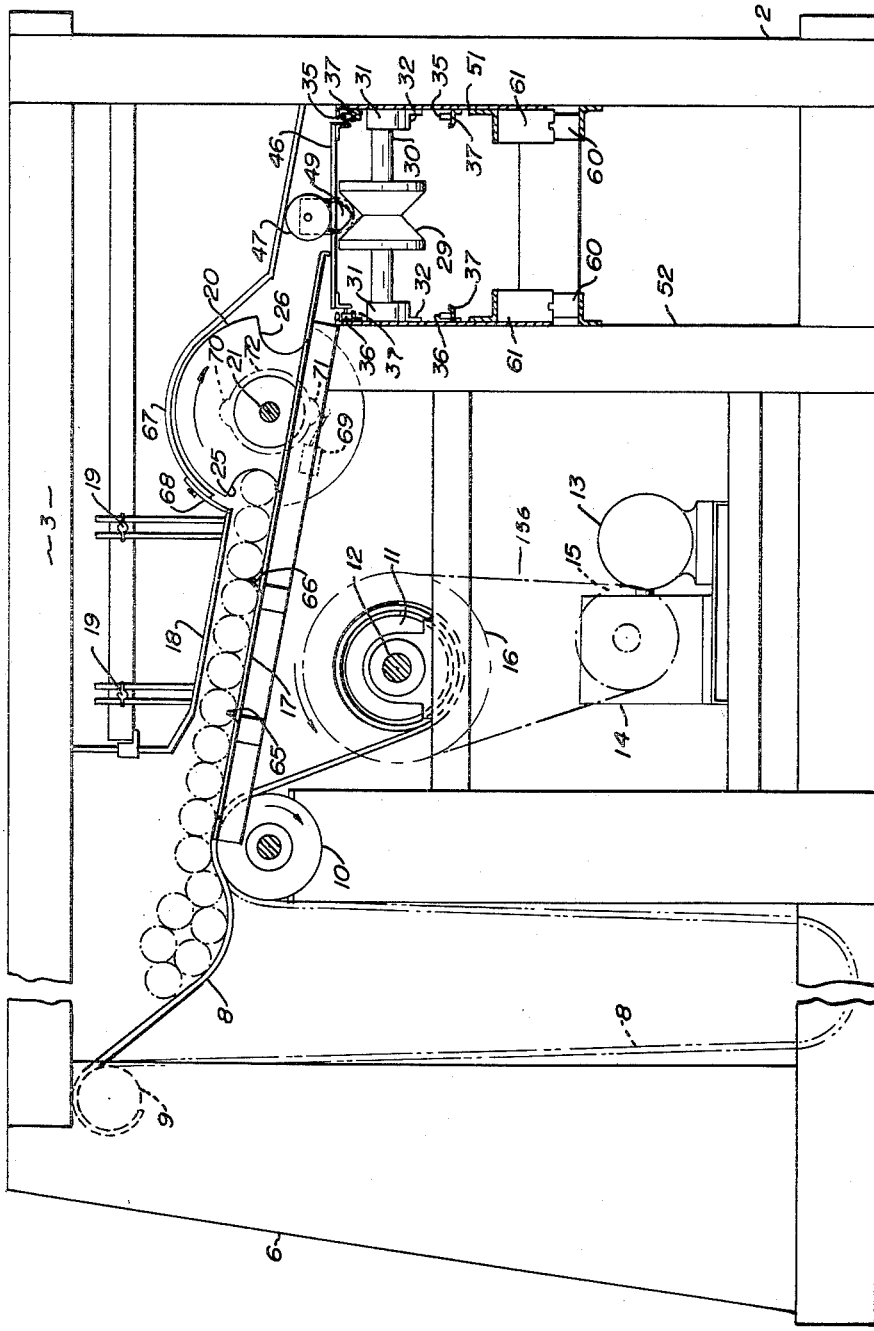
FIGURE 3 is a vertical section taken on the line 3—3 of FIGURE 1.

Referring to the drawings in more detail, the supporting frame of the apparatus includes cross base channel irons 1 with upright corner posts 2. The corner posts are connected by horizontal angle beams 3 at the front and sides of the machine.

At the rear of the apparatus is an open bay 4 between two opposed frame sections 5 and 6 extending toward each other from the rear corners of the apparatus. The bay 4 is at the center of a generally open rectangular area 7 reaching across the full width of the machine.

On each side of the bay 4 traversing the area 7 are two flat fabric belts 8. These are firmly secured on the rear side of the area around stationary anchoring bars 9. Toward the front of the apparatus the belts pass over idler pulleys 10 and around wind-up drums 11 to which their opposite ends are fastened.

In their initial position the belts are looped downward adjacent the floor level between the anchoring bars 9 and idler pulleys 10 as shown in dotted lines in FIGURE 3.

All four belts are always in the same relative raised position as their wind-up drums 11 are mounted on the common shaft 12. This shaft is driven by motor 13 through the speed reducer 14, and sprockets 15 and 16 with their connecting chain 156.

An angle iron runway 17 inclines downwardly toward the front of the machine from a point level with and alongside the upper periphery of each idler pulley 10. Above the inclined runways 17 are vertically adjustable guides 18. These are held in position by clamping nuts 19.

Figure 4:
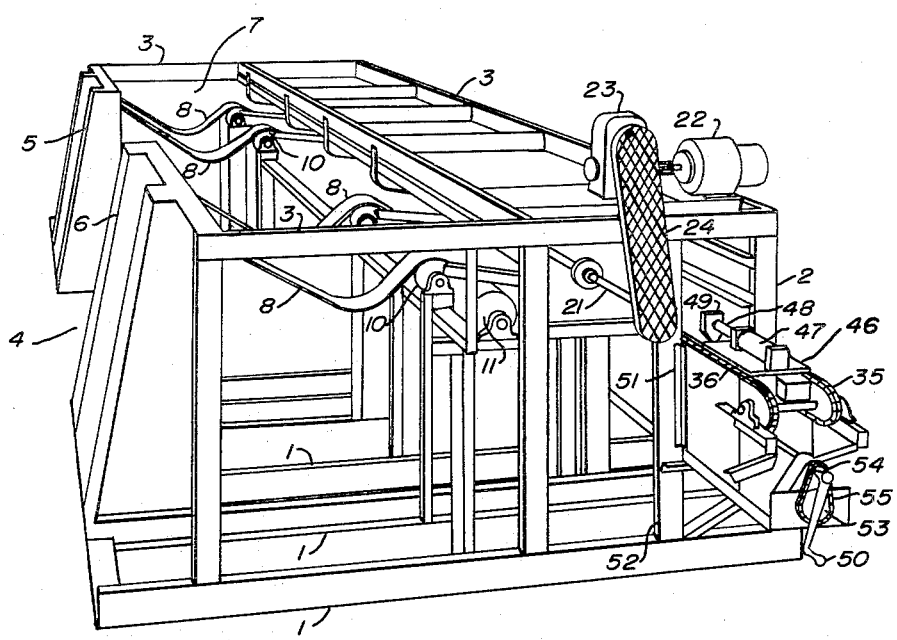
FIGURE 4 is a perspective view of the same embodiment of the apparatus.

In line and in advance of each belt 8 and adjacent each runway 17 is an indexing wheel 20. A fifth wheel is positioned in front of bay 4. All are mounted on a common horizontal shaft 21. This shaft is driven by motor 22 through speed reducer 23 and a set of chain and sprockets covered by the meshed guard 24 as shown in FIGURE 4. The indexing wheel 20 has preferably two diametric opposite circular notches 25 and 26.

The runways 17 extend past the index wheels 20 to terminate slightly above a horizontal line along the near edge of a series of V pulleys 29 which are individually fixed to one of a series of shafts 30. The latter are rotatably supported in end bearings 31 which in turn are attached to angle iron mounts 32.

A pair of endless roller chains 35 and 36 are on opposite sides of the series of pulleys. The upper span of each chain is supported upon track forming angles 37 above the bearings 31 with the lower span of each chain slidably supported on similar tracks 37 below the bearings. The chains are driven together by sprockets 40 and 41 on a common shaft 42 through reversible torque motor 43 as may be seen in FIGURES 1 and 2.

Carried by the chains is a platform 46 which rides slightly above the pulleys 29. Fixed upon the platform is an air cylinder 47 from which a piston rod 48 extends as best disclosed in FIGURE 4. At the end of the rod is a pusher plate 49 with a V shaped lower portion, depending substantially into the horizontal line of the V grooves of the pulleys 29.

The horizontal position of the pulleys 29 and the path of the pusher plate 49 may be quickly and accurately raised or lowered through crank handle 50. This is accomplished through the mounting in a complete assembly the pulleys, pulley shafts and bearings, and the chain and chain drive in a rectangular frame 51 which is vertically slidable between corner posts 2 and the adjacent posts 52.

Driven by the crank handle 50 through the reducing arrangement of sprockets 53 and 54 and chain 55 is a screw shaft 56. This shaft has a threaded thrust engagement with a rod 59 extending across the full front of the machine below the frame 51 as shown in FIGURE 2. Fixed to the rod 59 and movable therewith are wedge blocks 60. These support the vertically slidable frame 51 through contact with the complementally inclined surfaces of the triangular footings 61 at the bottom of the frame 51.

In the use of the storage and feeding apparatus of this invention in the embodiment herein described and illustrated a supply of tubes or other elongated objects to be handled is deposited across belts 8, which preparatory to the reception of the tubes have been lowered to approximately the floor level. This is accomplished by using a manual switch to operate motor 13 in reverse rotation and turn drums 11 to permit unwinding therefrom of the belts 8. The weight of the belts is sufficient for them to drop of their own accord into loop form between anchoring bars 9 and idler pulleys 10 as illustrated in FIGURE 3.

While a crane or other conveyance may be employed to bring a load or bundle of tubes to this apparatus, a preferred arrangement utilizes lift trucks carrying four posted open slided racks, across and through which the tubes are disposed.

The lift truck raises the rack above the top of frame sections 5 and 6 so that the protruding ends of the tubes will clear these sections as the truck enters bay 4. The rack is then lowered to the floor and the lift truck withdrawn.

In one size of the embodiment here presented tubes of twenty foot length may be accommodated. With racks approximately three feet in width and height a substantial quantity of such tubes may be deposited in the apparatus, the exact number depending, of course, on the tube diameter. With the load of tubes in place within the loops of the belts 8 in rectangular area 7, the full cycle of the machine may begin through the functioning of circuits under the control of a single manual switch.

Primarily, motor 13 is actuated to turn belt wind-up drums 11. The rotation of drums 11 is necessarily very slot and their speed is determined principally by speed reducer 14, which, in one example, turns once for every 642 revolutions of motor 13. There is a further reduction from two to one due to the comparative sizes of sprockets 15 and 16.

As the belts are wound upon drums 11 the load of tubes is raised until the upper layer arrives above the level of idler pulleys 10 and roll down runways 17. Extending slightly above runways 17, as shown in FIGURE 3, are two spaced switch arms 65 and 66 associated with two unillustrated switches in series. With the runway sufficiently full of tubes so that the foremost is in notch 25 of index wheel 20, and the following tubes lie in close sequence back over both switch arms to depress them, the circuit controlled by the associated switches is energized.

This circuit actuates motor 22, which through reducer 23 and the train of sprockets and chain covered by the meshed guard 24 turns shaft 21 and the index wheels 20 thereon in a clockwise direction. The tube lodged in notches 25 is accordingly carried with the wheels under guards 67 and is released upon the terminating ends of runways 17 as the wheels complete a turn of 180°.

Simultaneously with the arrival of notches 25 in aligned discharge position, motor 22 is brought to an abrupt stop by shut-off switch 69 breaking the circuit to motor 22. Switch 69 is located adjacent shaft 21 with its switch arm in the path of projections 70 and 71, which are 180° apart on the periphery of cam 72 fixed to shaft 21.

With this arrangement switch 69 always stops motor 22 after a half turn of index wheels 20, and wheels 20 in their stopped positions have either notch 25 or 26 ready to receive a tube from the fore part of runways 17 and the opposite notch in position to release a tube on the terminating portion of runways 17.

From the ends of runways 17 the released tube which will subsequently be designated as tube $a$ drops down into V pulleys 29. As it does so, it trips switch 75 shown in FIGURES 1 and 2. This switch actuates motor 43 to start chains 35 and 36 turning clockwise around their sprockets with the upper strands of the chains moving rapidly to the right as viewed in FIGURES 1 and 2.

The speed of the chain movement may be as high as 250 feet per minute which is a rate more than adequate to satisfy the requirements of any presently known machine that may be associated with this apparatus.

The chain movement carries the platform 46 from its initial position at the extreme left of the apparatus, as viewed in FIGURES 1 and 2, toward the left end of tube $a$ lodged in the V pulleys. The pusher plate 49 then engages the end of tubes $a$ to drive the tube rapidly to the right toward the machine being fed. The latter may be a conventional cut-off machine which seizes the approaching end of the projected tube and draws the tube into the machine for the desired subdividing operations.

A jarring contact between the pusher plate 49 and the end of the tube is prevented through the cushioning effect of the air in the cylinder 47 behind the piston to which the pusher plate is connected.

Motor 43 is a slipping or torque type, whereby, when the moving tube $a$ abuts a slower moving proceding tube the motor speed slackens to drive the following tube $a$ at only sufficient speed to keep it in slight urging contact with the abutted tube.

When tube $a$ has reached a predetermined point in the receiving cut-off machine where it is firmly held therein, the platform 46 has arrived at a position to trip switch 77 which is located along the path of the platform.

Actuation of switch 77 stops and reverses motor 43 and chains 35 and 37 driven thereby, resulting in the rapid retraction of the platform 46 back to its starting position where the platform operates another switch 78 which stops motor 43, the chains and the platform. Switch 78 also starts motor 22 turning the index wheels 20.

The described cycle then repeats itself with tube $b$ in notches 26 being brought up and around the index wheels to release position over the terminating ends of runways 17. Again rotation of wheels 20 is interrupted after traveling through an 180° arc by shut-off switch 168 which is actuated by projection 71 of cam 72.

Tube $b$ then drops upon V pulleys 29 and through its motivating contact with switch 75 is immediately propelled by the pusher plate 49 toward the cut-off machine. Switch 77 is again activated to return the platform 46 as soon as tube $b$ is under the secure control of the cut-off machine.

Unless interrupted by manual switches and until the supply of tubes supported in the belts 8 is exhausted, the apparatus will continue to function with the tubes being delivered singly by the index wheels to the V pulleys and then propelled to the associated machine.

When the belts 8 are drawn taut from anchoring bars 9 across over idler pulleys 10, a switch 82 illustrated in FIGURE 1 is tripped by the belt 8 nearest the left side of the apparatus. This switch breaks the circuit to motor 13 and thereby stops further windup and possible breakage.

While switch arms 65 and 66 along the first runway 17 start the original turning of the index wheels 20 the movement of the wheels is automatic thereafter. The wheels will continue to deliver tubes up to and including the last one even though switch arms 65 and 66 are not held down by the last few tubes.

With varying diameters of tubes, guides 18 are vertically adjusted to permit easy passage without jamming of a single row of tubes. As guards 67 over wheels 20 are stationary, slidable extensions 68 are fastened to the edges of the guards 67 to close any gap arising from the lowering of guides 18.

While replacement indexing wheels 20 with notches 25 and 26 of varying size may be utilized to accommodate tubes of various diameters, a preferred arrangement is to have adapters that fit upon the wheels to change the size of the notches.

It is most important that tubes delivered by this apparatus to a receiving cut-off machine arrive in exact axial alignment to properly enter the machine and be accurately placed in regard to the seizing and cut-off mechanisms in the machine. Re-alignment is usually required for any change in tube diameter.

The arrangement including the wedge blocks 60 and the triangular footings 61 of the rectangular frame 51 provided by this invention is most effective in easily securing this precise alignment.

Sprocket 54 to which crank 50 is fixed has a diameter about one half that of the sprocket turning screw shaft 56. The inclined angle of the wedge blocks is only 15° and the threads on the shaft 56 number not less than eight to the inch. It may be seen that moving the hand portion of crank 50 through an arc of several inches is translated to a fine fraction of an inch rise or descent of rectangular frame 51 and the tube supporting V pulleys 29 carried by the frame. The tongue and groove engagement of wedge blocks 60 with the triangular footings 61, as shown in FIGURE 3, assures longitudinal alignment between these elements.

While a single embodiment has been illustrated and described, it should be understood that various modifications may be made therein without departing from the spirit of the invention or the scope of the following claims.

For instance, a single belt may be utilized on each side of the receiving bay 4, or in a machine to which tubes are carried by a crane the bay would not be necessary and one broad belt, centrally located, could be substituted for a plurality of spaced belts.

Another variation involves indexing wheels 20 with notches such as 25 and 26 deep enough to receive a number of tubes at one time instead of a single one. For certain purposes, more likely to relate to bar stock than to tubing, such notches could feed two or more pieces simultaneously to pulleys 20. In such cases, instead of a V shape, the pulleys should have a receiving outline of a concave form.

A further natural alternate would be the use of a hydraulic system for moving the pusher plate instead of the electric motor arrangement. This modification would be particularly adaptable for pieces of comparatively short lengths.

What we claim is:

1. In an apparatus for storing and feeding elongated articles such as tubes, belts looped to receive a quantity of the articles, fasteners fixedly holding the ends of the belts on one side of the loops, guides lower than the fasteners over which the belts run on the other side of the loops, means slowly drawing the belts over the guides to raise the belts and the articles carried thereby whereby the articles are gradually moved upon the belts over the guides, an inclined runway constructed to receive a single row of the articles from the belts, a conveyor including a series of grooved rollers at right angles to the runway and beyond the termination thereof, means periodically removing the foremost article from the runway and depositing it lengthwise upon the conveyor, reciprocable means associated with the conveyor energized by the arrival of a tube to propel the tube along the conveyor on the grooved rollers a predetermined distance and then return to its original position in readiness for the following tube.

2. An apparatus according to claim 1 in which the reciprocable means includes an endless chain, a reversing motor driving the chain and a pusher plate carried by the chain for propelling contact with the successive articles.

3. An apparatus according to claim 2 in which a shock absorber element is behind the pusher plate to reduce the jar of contact of the pusher plate with the article.

4. In an apparatus for storing and feeding elongated articles such as tubes, belts looped to receive a quantity of the articles, means fixedly holding the ends of the belts on one side of the loops, rounded means lower than the holding means over which the belts may be drawn on the other side of the loops, motor driven means slowly drawing the belts over the rounded means to raise the loops and the articles carried therein whereby the articles are gradually spilled over the rounded means, an inclined runway constructed to receive a single row of the articles spilled over the rounded means, a conveyor including a series of grooved rollers at right angles to the runway and beyond the termination thereof, a revolvable notched disc periodically removing the foremost article from the runway and delivering it lengthwise upon the conveyor, reciprocable means associated with the conveyor energized by the arrival of an article to propel the article along the conveyor on the grooved rollers a predetermined distance and then to return to its original position in readiness for the following article.

5. An apparatus according to claim 4 in which there is an electric motor for driving the reciprocable means associated with the conveyor and a switch for actuating the motor is motivated by the arrival of an article upon the conveyor.

6. An apparatus according to claim 5 in which a second switch positioned along the conveyor stops and reverses the motor when the article is propelled the predetermined distance.

7. An apparatus according to claim 4 in which there are switch devices tripped by the arrival of articles upon the runway from the looped belts which first actuate the revolvable disc to deliver the foremost article to the conveyor, and in which there are elements responsive to the return of the reciprocable means, associated with the conveyor, to its original position which actuate the revolvable disc subsequent to its first actuation by the switch devices.

References Cited in the file of this patent

UNITED STATES PATENTS

| | | |
|---|---|---|
| 199,534 | Gorsline | Jan. 22, 1878 |
| 214,439 | Palmer | Apr. 15, 1879 |
| 806,846 | Routson | Dec. 12, 1905 |
| 896,781 | Webster et al. | Aug. 25, 1908 |
| 1,285,584 | Baines et al. | Nov. 26, 1918 |
| 1,654,402 | Binns | Dec. 27, 1927 |
| 1,892,670 | Jaeger | Jan. 3, 1933 |
| 2,043,556 | Protin | June 9, 1936 |
| 2,106,469 | Seil | Jan. 25, 1938 |
| 2,210,531 | Engelbaugh et al. | Aug. 6, 1940 |
| 2,307,717 | Woodbury | Jan. 5, 1943 |
| 2,320,039 | Jobert | May 25, 1943 |
| 2,436,223 | Newcomer | Feb. 17, 1948 |
| 2,525,953 | Saxe | Oct. 17, 1950 |
| 2,546,866 | Overly | Mar. 27, 1951 |
| 2,652,137 | Taranto | Sept. 15, 1953 |